E. HEYDON.
RAILROAD CONSTRUCTION.
APPLICATION FILED APR. 17, 1916.
1,196,689.
Patented Aug. 29, 1916.
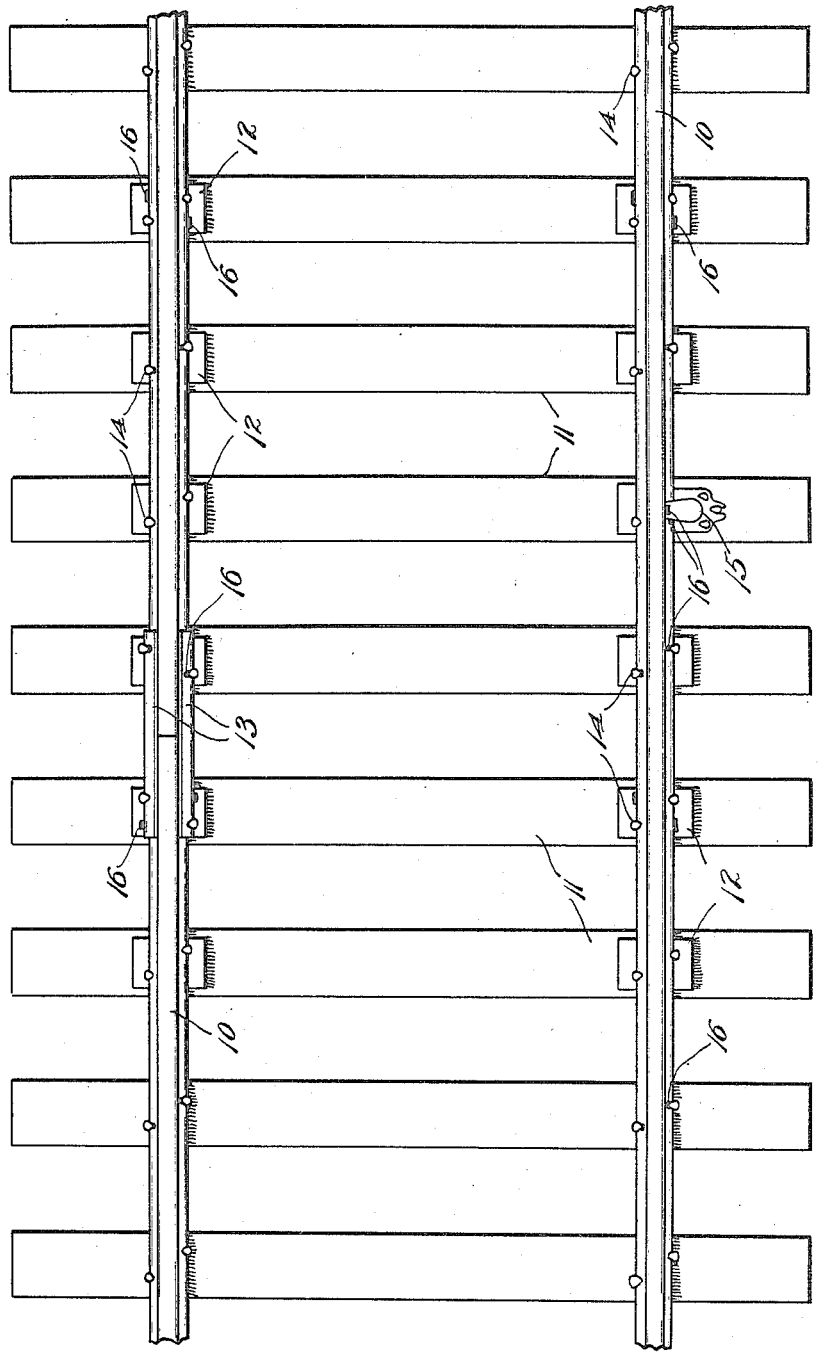
WITNESSES:
Frank A. Fahle
Josephine Gasper
INVENTOR
Edward Heydon,
BY
Hood & Schley.
ATTORNEYS

UNITED STATES PATENT OFFICE.

EDWARD HEYDON, OF INDIANAPOLIS, INDIANA.

RAILROAD CONSTRUCTION.

1,196,689.  Specification of Letters Patent.  Patented Aug. 29, 1916.

Application filed April 17, 1916. Serial No. 91,572.

*To all whom it may concern:*

Be it known that I, EDWARD HEYDON, a citizen of the United States, residing at Indianapolis, in the county of Marion and State of Indiana, have invented a new and useful Railroad Construction, of which the following is a specification.

Much difficulty has been experienced on railroads, both steam and electric, because of the creeping of the rails longitudinally, largely on account of the reaction of the driving wheels on the rails. This is particularly noticeable on one-way tracks, where the reaction is always in the same direction. This creeping is particularly disadvantageous at crossings, where by reason of it the crossing tracks are often carried several inches out of line. Many devices have already been proposed for stopping this creeping, but with indifferent success, largely because the anti-creeping devices work loose from the rails, because of the jarring due to the traffic.

It is the object of my present invention to stop this creeping, in a simple, effectual, and yet inexpensive way.

In carrying out my invention, I weld the rail or some part rigid therewith, conveniently by spot welding, to the heads of the usual holding spikes or some other parts rigid with the ties. This can be done rapidly and cheaply by gas or electric spot welding, and effectually prevents creeping of the rails. Moreover, it prevents the spikes from working loose and coming out of the ties.

The accompanying drawing illustrates my invention.

The single figure of the drawing is a plan view of a section of railroad track equipped with my invention.

The rails 10 rest on the ties 11 in the usual manner, in some places resting directly on the ties, as illustrated on the end ties of the drawing, and in others resting tie plates 12 interposed between the rails and the ties. Abutting rail ends are fastened together by the usual fish plates 13. The rails 10 are held to the ties 11 by the usual spikes 14, the heads of which overlap the base flanges of the rails 10 or the base flanges of the fish plates 13, and when tie plates 12 are used the spikes 14 usually pass through holes in such tie plates into the ties. Because the spikes 14 pass through holes in the tie plates 12, these tie plates are rigid with the ties; and the fish plates 13, because they are bolted to the abutting rail ends which they interconnect, are of course rigid with the rails. At intervals, rail braces 15 held to the ties by spikes passing through holes in said braces bear against the rail.

In order to prevent creeping, I weld the spike heads 14 or the tie plates 12 or the rail braces to the rails 10 or fish plates 13. This welding is indicated by the solid black marks 16 on the drawing. It is not necessary that this welding be done on each tie, if the welding is used for anti-creeping purposes only, for it is sufficient ordinarily if it be done on every second or third tie, or even less frequently. Where the rails rest directly on the ties, the spike heads are themselves welded to the underlying base flanges of the rails, as illustrated on the second tie from the left of the drawing. Where tie plates 12 are interposed, the welding may be either of the spike heads to the rail flanges or of the tie plates to the rail flanges, as illustrated on the third and second ties respectively from the right of the drawing. Where fish plates 13 are used, the spike heads 14 may be welded to such fish plates, or if tie plates are also used such tie plates may be welded to the fish plates, as illustrated on the fifth and sixth ties respectively from the right of the drawing. Where rail braces 15 are used they may be welded to the rail where they engage it, as illustrated on the fourth tie from the right of the drawing. This welding of the rail or some part rigid therewith to a spike head or some other part rigid with the tie effectually prevents creeping. Moreover, when the welding is of the spike heads themselves, it prevents the spikes from working up out of the ties, so that a double purpose is served. The welding can be accomplished easily, quickly, and with very small expense by the modern spot welder, electric or gas.

I claim as my invention:

1. In combination, a railroad rail, ties on which said railroad rail rests, and spikes driven into such ties and overlapping a part of such rail, said spikes being welded to the rail.

2. In combination, a railroad rail, ties on which said railroad rail rests, a part bolted to said rail, and spikes driven into the ties and engaging said part bolted to the railroad rail, the engaging portions of said spikes and said part bolted to the rail being welded together.

3. In combination, a railroad rail, ties on which said railroad rail rests, tie plates interposed between the ties and the rail, and spikes projecting through holes in said tie plates into the ties, said tie plates being welded to the rail.

4. In combination, a railroad rail, ties on which said railroad rail rests, a member engaging a tie and the rail, and spikes passing through such member and holding it to the tie, said member being welded to the rail.

In witness whereof, I have hereunto set my hand at Indianapolis, Indiana, this fifteenth day of April, A. D. one thousand nine hundred and sixteen.

EDWARD HEYDON.